Figure 3:
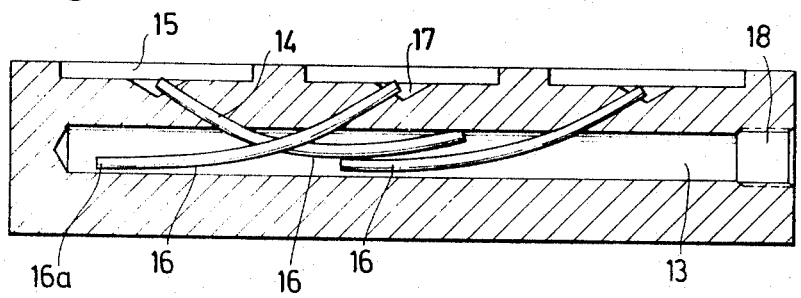

United States Patent
Beisemann

[15] 3,650,580
[45] Mar. 21, 1972

[54] HYDROSTATIC BEARING

[72] Inventor: Heinz Beisemann, Monchengladbach, Germany

[73] Assignee: P. Konings Machinefabriek, Ijzer-en Metaalgieterij N.V.

[22] Filed: June 10, 1970

[21] Appl. No.: 45,033

[30] Foreign Application Priority Data

June 14, 1969  Germany......................P 19 30 376.5
Oct. 22, 1969  Germany......................P 19 53 160.3

[52] U.S. Cl. ................................................................308/9
[51] Int. Cl. ...........................................................F16c 17/16
[58] Field of Search ........................................308/9, 122, 5

[56] References Cited

UNITED STATES PATENTS 2,049,343  7/1936  Warren......................................308/9
3,062,046  11/1962  Evans........................................308/5

Primary Examiner—Martin P. Schwadron
Assistant Examiner—Frank Susko
Attorney—Herbert E. Kidder

[57] ABSTRACT

In a hydrostatic bearing comprising a bearing unit having a friction face, bearing pockets in the friction face, means for feeding pressurized liquid into the pockets and a capillary associated with each pocket to act as a hydraulic resistance: the improvement of a common feed passage for a plurality of the bearing pockets, an individual feed duct leading into each of the bearing pockets and the capillary associated with each bearing pocket is in the form of a capillary tube have two ends, one end being sealingly secured in the feed duct leading to that bearing pocket and the other end extending into the common feed passage.

11 Claims, 9 Drawing Figures

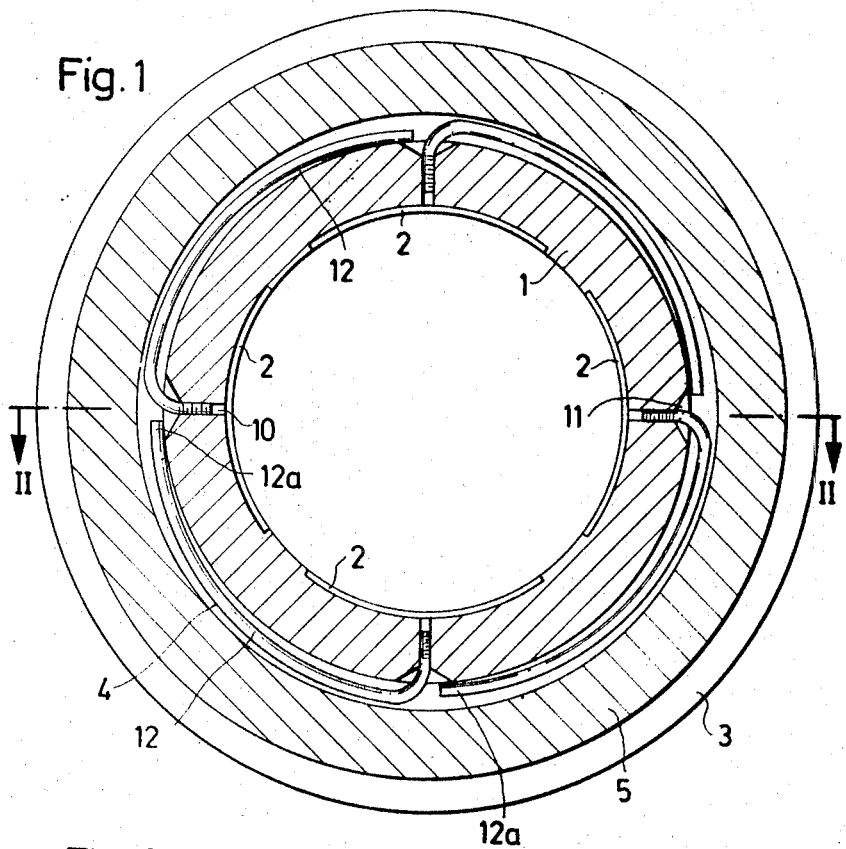
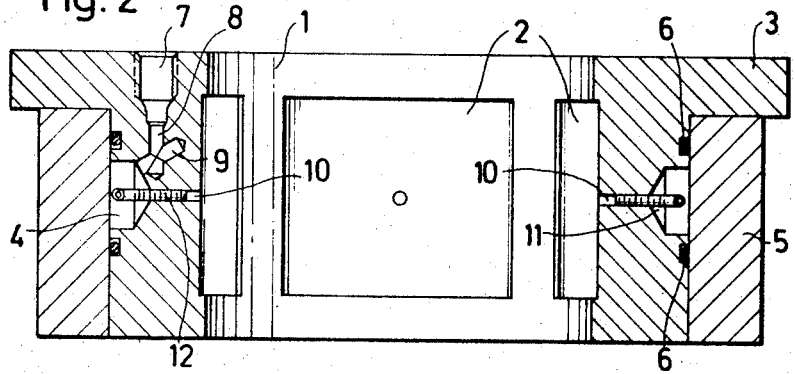

INVENTOR.
HEINZ BEISEMANN

INVENTOR.
HEINZ BEISEMANN

INVENTOR.
HEINZ BEISEMANN

HYDROSTATIC BEARING

The invention relates to hydrostatic bearings comprising bearing pockets formed in friction surface of the bearing unit and arranged to receive oil or other liquid fed under pressure through capillary ducts.

Hydrostatic bearings are known in the form of radial and axial bearings as well as in the form of machine saddle slideways and hydrostatic nuts for lead screws, and they are particularly used in the construction of machine tools. Hydrostatic bearings operate in such manner that a pressure-resistant film of oil or other liquid is built up between the contact surfaces of relatively displaceable parts, which film is also maintained under fluctuations of load, to prevent direct contact between the two bearing surfaces.

For acceptable operation of hydrostatic bearings, it has been found to be appropriate for each bearing pocket to be supplied from a separate pump, or for a shared pump to be incorporated for all or a group of bearing pockets, in which case each individual bearing pocket is preceded by a hydraulic resistance whereby a fall in the pressure in one bearing pocket does not adversely affect the feed to the others fed from the same pump.

Restrictors or capillaries may be considered as possible hydraulic resistances. Restrictors have been found to be disadvantageous however. They represent a hydraulic resistance which is independent of viscosity, whereas the hydrostatic bearing has a hydraulic resistance which is dependent on viscosity in consequence of laminar flow conditions. Since the bearing is arranged in series with the restrictor, the ratio between the series resistance represented by the restrictor and the bearing resistance, which ratio is very important for the properties of the hydrostatic bearing, also varies during temperature fluctuations and fluctuations in the viscosity of the oil.

This disadvantage is eliminated by application of capillaries as series resistances, since these equally have a resistance characteristic dependent on viscosity. Accordingly, the ratio between the resistances always remains constant under application of capillaries as series or barrier resistances, even with fluctuating viscosity of the oil.

Another reason for the frequent use of capillaries as series resistances resides in that the aperture diameter of the capillaries is substantially greater by comparison with restrictions of similar hydrostatic series resistance value, thereby reducing the risk of blockage by solid material.

However, the known hydrostatic bearings using capillaries have the disadvantage that a connector with a capillary tube must be fitted for each bearing pocket. To this end, the capillary tubes must be adapted precisely in respect of their length and diameter to the special conditions applicable to each bearing, which requires voluminous calculations for each kind and type of bearing. Also, the labor cost for assembly is considerable in the case of known hydrostatic bearings, since four connectors are needed for a bearing comprising four bearing pockets for example.

The invention is based on the problem of simplifying the structural arrangement and assembling operation of hydrostatic bearings. To this end, the hydrostatic bearings are to be formed in such manner that they may be employed as readymade fitting elements, without requiring any drilling in the housing for the fitting of the pressurized feed passage.

Accordingly, the invention consists in a hydrostatic bearing comprising bearing pockets formed in a friction face of a bearing unit and arranged to receive pressurized oil or other liquid through capillaries, in which the capillaries consist of capillary tubes each having one end sealingly arranged in a bearing pocket feed duct and the other end leading into a common pressurized feed passage.

Provision may be made for the other extremities of the capillary tubes to project in a non-fastened manner into the pressurized feed passage. The entry of pressurized liquid into the capillary tubes thus occurs at the free extremities. The pressurized liquid then issues from the fastened extremities and flows into the bearing pockets.

Bearing pocket feed tubes may be arranged transversely to the common pressurized oil feed passage and the capillary tubes conform generally to the configuration of the pressurized oil feed passage and of the bearing pocket feed tubes.

The fastening of the capillary tubes may be performed by screwing into the bearing pocket feed tubes or by welding or brazing into counterbores of the bearing pocket feed tubes.

In the case of a radial bearing, provision may be made for the pressurized feed passage to consist of an annular groove surrounded by a ring, the ring simultaneously forming the external periphery of the radial bearing. A particularly simple method of assembly of the hydrostatic bearing is accomplished by this measure, since the annular groove is formed first, after which the bearing pocket feed passages are formed, for example in the form of drillings leading to the bearing pockets, after which the capillary tubes are fastened, and the annular groove can finally be closed off, possibly with interposition of seals, by means of the ring, which may be shrunk on.

In the case of hydrostatic bearings, it is considered to be disadvantageous moreover, that with a hydrostatic bearing having several individual connectors for the supply of pressurized oil, the rise in temperature caused by pressure drop in the capillaries results in a reduction of the viscosity of the pressurized oil. This effect cannot be completely prevented even by inclusion of a cooling system in the pressurized oil supply. Since a constant viscosity is taken as a basis in the calculations affecting hydrostatic bearings, greater deviations from the theoretically calculated bearing values intervene in practical application. If a cooling system is not incorporated, pressurized oil which is already warm is fed to the bearing, which causes a further increase in the deviations occuring in practice. Although precooling of the pressurized oil thus cannot in any event prevent the temperature rise occurring in the capillaries, an excessive degree of precooling moreover results in the forming of dew at appropriate external temperatures.

The actual bearings, that is to say the bearing surfaces of hydrostatic bearings sliding on each other through an oil film, cannot be cooled either in sufficient degree in the present forms of bearing. Although forms of bearings are known in which the bores in the housings receiving the bearings have grooves wrought in them which are sealed by the bearing itself, and a part of the heat generated within the bearing is carried off if a coolant is caused to circulate through these grooves, it is disadvantageous in this connection that the machining of grooves into the high precision bore produced is very costly, and sealing problems arise in this connection.

To eliminate the problem arising in respect of cooling, it is further proposed to provide a possibility of cooling the capillaries as well as the actual bearing points.

This is accomplished by the fact that another connector for drawing off pressurized oil not required to act on the bearing pockets is incorporated in the hydrostatic bearing in addition to the connector connected to the pressurized oil feed passage. If a surplus of cooled pressurized oil is fed to the hydrostatic bearing, the surplus portion of the oil flows past the capillaries and back to the oil pump through the additional connector. The capillaries are concomitantly cooled along their entire length.

In the case of radial bearings, it is appropriate for the two connectors to be arranged at opposite sides of the hydrostatic bearing in each case. In other forms of bearings, the secondary or additional connector should be arranged in such manner that a flow of oil between the two connectors flows past all the capillaries.

In this connection it is advantageous for the pressure-limiting valve needed for the oil supply system to be arranged down stream of the additional connector. In the known embodiments of hydrostatic bearings, the hydrostatic bearing is down stream of the pressure-limiting valve.

To secure cooling of the actual bearing points, provision may be made to incorporate cooling passages traversed by the flow of pressurized oil in the direction of the pressurized oil feed passage. The possibility is concomitantly available to connect the cooling passages in shunt with the pressurized oil feed passage. The connection of the cooling passages may then be made to the connector for the pressurized oil feed passage and to the connector for drawing off the pressurized oil not needed to act on the bearing pockets.

Alternatively a separate coolant circulation may be incorporated for the cooling passages. Since, in such a case, there is no connection between the oil circuit and the coolant circuit, separate connectors are required in each case for the inflow and outflow of the coolant.

It is advantageous that it is possible to eliminate the cooling grooves hitherto required in the reception bores and reception surfaces of gears and machine saddles, as well as the sealing problems arising.

A closable and externally accessible connector may be incorporated for each bearing pocket. These connectors serve the purpose of accommodating a measuring instrument, so that it is possible in this way to measure the pressure in the individual bearing pockets of the bearing in the assembled condition.

Figure 4:
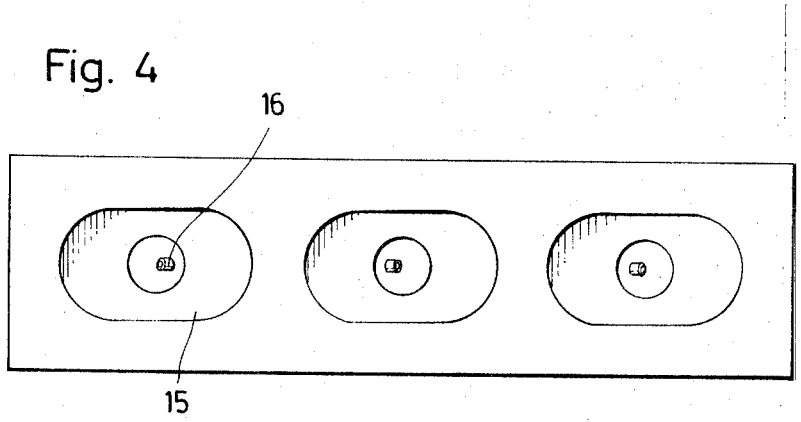
Figure 5:
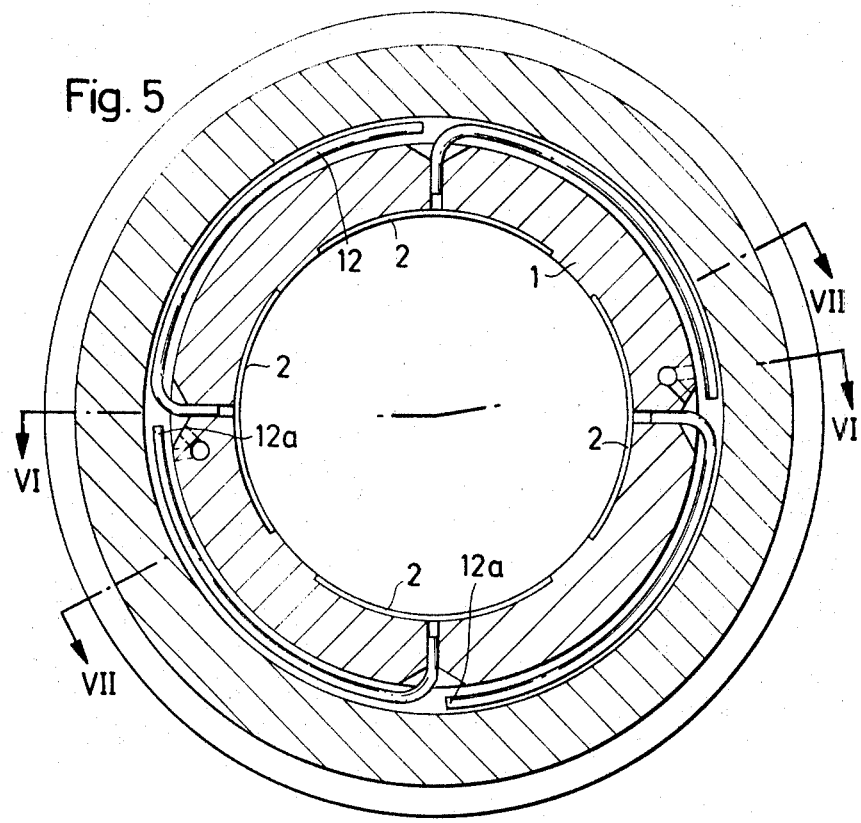
Figure 6:
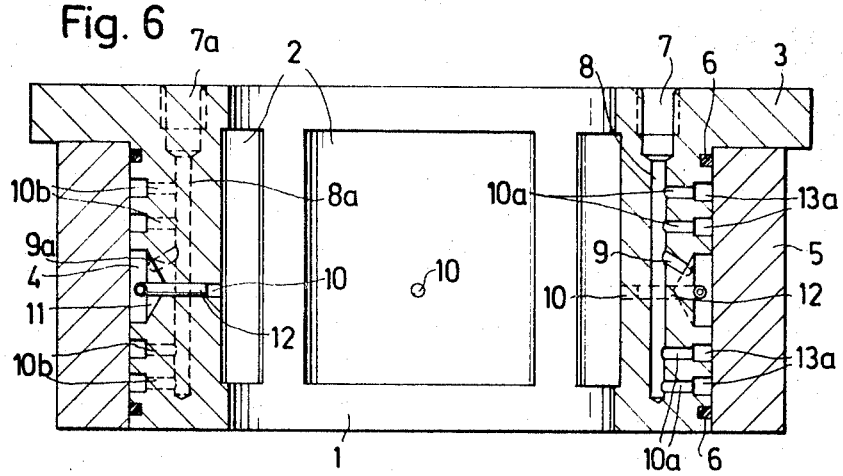
Figure 7:
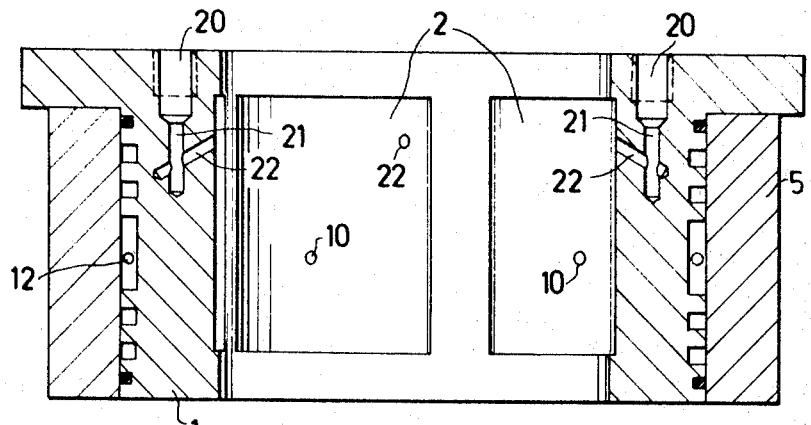
Figure 8:
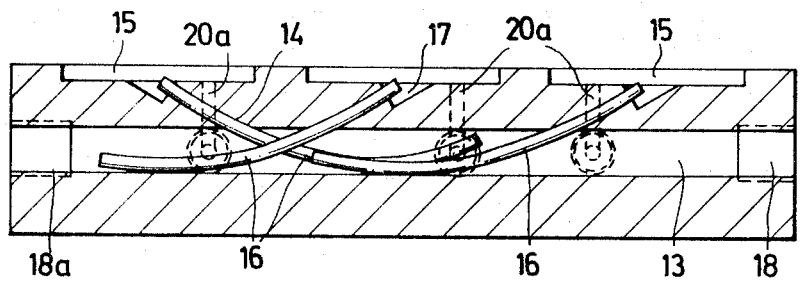
Figure 9:
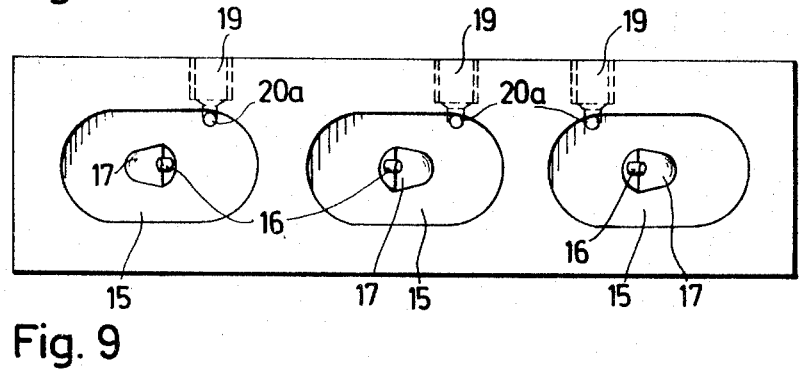

The invention will be further described in various embodiments given by way of example and illustrated in the accompanying drawings, in which:

FIG. 1 is an axial section through a radial hydrostatic bearing;
FIG. 2 is a section along the line II—II in FIG. 1;
FIG. 3 is a sectional view of a hydrostatic slideway;
FIG. 4 is a plan view of the structure of FIG. 3;
FIG. 5 is an axial section through a radial hydrostatic bearing with a cooling system;
FIG. 6 is a section along line VI—VI in FIG. 5;
FIG. 7 is a section along line VII—VII in FIG. 5;
FIG. 8 is a sectional view of hydrostatic slideway with a cooling system; and
FIG. 9 is a plan view of the structure of FIG. 8.

The radial hydrostatic bearing illustrated in FIG. 1 has a cylindrical bearing element 1. On the inner surface are incorporated altogether four bearing pockets 2 in opposed pairs. On the outer surface, the bearing unit 1 has a flangelike extension 3 at one longitudinal end. A continuous annular groove 4 is formed approximately in the middle of the basic bearing unit 1. This annular groove 4 is sealed off by means of a ring 5 which is secured on the outer surface of the bearing unit 1, e.g., by shrink fitting, and with one end bears against the extension 3. Seals 6 are fitted between the bearing unit 1 and the ring 5.

The annular groove 4 is fed with pressurized oil or other liquid from a pump which is not shown, through a connector 7 and bores 8 and 9. A drilling 10 having an end opening towards the annular groove 4 and provided with a counterbore 11, is provided to carry the oil to each bearing pocket. Capillary tubes 12 are secured in the drillings 10. The securing is performed either by brazing or welding, or by screwing threaded ends of the tubes 12 into tapped holes 10, as in FIGS. 1 and 2; the latter securing method being preferable for larger bearings. The capillary tubes 12 correspond to the configuration of the pressurized oil feed passage consisting of the annular groove 4 and the drillings 10.

When the annular groove 4 receives pressurized oil, this oil passes through the freestanding ends 12a into the capillary tubes 12. After appropriate pressure reduction, the pressurized oil passes into the bearing pockets 2 to form a pressure resistant oil film between the radial bearing element 1 and a shaft (not illustrated) present within the radial bearing.

FIGS. 3 and 4 show a saddle slideway having a similar structure. The pressurized oil feed passage is a bore 13, from which drilling 14 lead obliquely outwards to bearing pockets 15. Starting from these bearing pockets, capillary tubes 16 are inserted into the bore 13 and have one extremity secured in counterbores 17 or in the drillings 14. The other extremity extends loosely into the bore 13. When the bore 13 forming the common pressurized oil feed passage receives pressurized oil from a pump (not shown) through a connector 18, the oil penetrates into the capillary tubes 16 and after appropriate pressure reduction emerges into the bearing pockets 15. In these, a pressure resistant oil film is then formed between the bearing and another plane friction face (not shown).

In the further examples of embodiment illustrated in FIGS. 5 to 9, the parts corresponding to the illustrations in FIGS. 1 to 4 are marked by the same reference numerals.

In the radial bearing illustrated in FIGS. 5 to 7, several cooling passages 13a in the form of grooves are formed in the bearing unit 1 in the direction of the annular groove 4. These grooves 13a are connected to the connector 7 through drillings 10a and the bore 8. The pressurized oil not required to act on the bearing pockets 2 enters the cooling grooves 13a, and emerges again through another connector 7a which is situated opposite the connector 7. To this end, the cooling passages 13a are connected via drilling 10b and a bore 8a with the further connector 7a. The further connector 7a serves the purpose of drawing off the pressurized oil and returning it to the oil pump or to an oil reception vessel. The connector 7a is followed by a pressure-limiting valve (not shown). The annular groove 4 is also connected to the bore 8a through a bore 9a.

A part of the pressurized oil fed to the hydrostatic bearing enters the cooling passages 13a and just like the surplus oil flows off in the pressurized oil feed groove 4 through the connector 7a. During throughflow of the cooled pressurized oil through the pressurized oil feed passage 4, the capillaries 12 are supplied with oil and are simultaneously cooled along their entire length. The oil flowing in the cooling passages 13a dissipates the heat generated at the actual bearing points and prevents the heat from penetrating outwards into possibly adjacent walls of gear systems or the like.

The possibility is available moreover to arrange a coolant supply for the cooling passages 13a separately from the oil circuit. In this case, two further connectors are needed, namely for the coolant inflow and the coolant outflow. In a system of this kind, the cooling performance is greater than in the case of the cooling system illustrated in FIG. 6, which is operated in a "secondary circuit."

It is apparent from FIG. 7, that each bearing pocket 2 has another connector 20 associated with it, which is closed off in the normal case by a plug (not shown) and is connected to the bearing pockets 2 through bores 21 and 22. If the plug is removed and a pressure gauge is connected instead to the connector 20, it is possible to measure the pocket pressure prevailing in the individual bearing pockets in the assembled condition of the bearing.

The hydrostatic slideway illustrated in FIGS. 8 and 9 has a structure similar to the arrangement just described. In this case, the pressurized oil feed passage consists of a bore 13, from which drillings 14 lead obliquely outwards to bearing pockets 15. Starting from these bearing pockets, capillary tubes 16 are inserted into the bore 13 and have one end secured in counterbores 17 or in the drillings 14. The other end projects loosely into the bore 13. When the bore 13 forming the common pressurized oil feed passage is acted upon by pressurized oil coming from a pump (not shown) through a connector 18, the oil enters the freestanding extremities of the capillary tubes 16 and after appropriate pressure reduction emerges into the bearing pockets 15. In these is then formed a pressure resistant oil film between the bearing and another plane friction surface (not shown).

Opposite to the connector, at the other end of the bore 13, is arranged another connector 18a which is followed by a pressure limiting valve. When a surplus of cooled pressurized oil is fed to the slideway or to the bore 13, this surplus flows along past the capillaries 16 and cools these along their entire length. Further bores acting as cooling passages (not shown) and extending parallel to the bore 18 may be traversed in secondary flow for the cooling of cooled pressurized oil. The cooling performance may also be increased by a separate cooling system, that is to say without connection between the cooling passages and the pressurized oil feed passage 13. In this case two further connectors will evidently also be needed, that is to say for the inflow and outflow of the coolant. Each bearing pocket 15 is associated with an externally accessible connector 19, which is in communication with the bearing pocket 15 through bores 20a. Normally, the connectors 19 are closed off by a plug (not shown). If the plug is removed, and if a pressure gauge is joined to the connector 19 instead, the pocket pressure in each bearing pocket 15 may be read off in the assembled condition of the slideway.

Various modifications may be made within the scope of the invention.

I claim:

1. In a hydrostatic bearing comprising a bearing unit having a friction face, bearing pockets in the friction face, means for feeding pressurized liquid into the pockets, the improvement comprising a common feed passage for a plurality of the bearing pockets, an individual feed duct leading into each of the bearing pockets, and an elongated capillary tube associated with each of said bearing pockets, said capillary tubes each having two ends, one end being sealingly secured in the feed duct leading to that bearing pocket, and the other end extending loosely into said common feed passage for the greater part of its length, said capillary tubes each providing hydraulic resistance to flow of said liquid into their respective bearing pockets, the resistance characteristic of said capillary tubes being dependent on viscosity.

2. A hydrostatic bearing as claimed in claim 1, in which the feed ducts are arranged transversely to the common feed passage and the capillary tubes conform generally in shape to the feed duct and the common feed passage.

3. A hydrostatic bearing as claimed in claim 1, in which the capillary tubes are threadedly received in the feed ducts.

4. A hydrostatic bearing as claimed in claim 1, comprising counterbores to the feed ducts in which the capillary tubes are welded into the counterbores.

5. A hydrostatic bearing as claimed in claim 1, comprising counterbores to the feed ducts in which the capillary tubes are brazed into the counterbores.

6. A hydrostatic bearing as claimed in claim 1, in the form of a radial bearing, in which the bearing unit has an outer face with a groove in the outer face constituting the common feed passage, and comprising a ring forming the outer surface of the bearing and closing the said groove.

7. A hydrostatic bearing as claimed in claim 1, comprising a connection for connecting the common feed passage to an external pressure source, and a further connector connected to the common feed passage for drawing off liquid fed to the common feed passage in excess of that required for feeding to the bearing pockets.

8. A hydrostatic bearing as claimed in claim 7, in which the connector and the further connector are arranged in opposition.

9. A hydrostatic bearing as claimed in claim 7, comprising cooling passages in the bearing unit for carrying pressurized fluid.

10. A hydrostatic bearing as claimed in claim 9, in which the cooling passages are connected in parallel with the common feed passage.

11. A hydrostatic bearing as claimed in claim 1, comprising a closable and externally accessible connector for each bearing pocket.

* * * * *